(12) United States Patent
Barnes (10) Patent No.: US 11,858,451 B2
(45) Date of Patent: Jan. 2, 2024

(54) AIRBAG MODULE HAVING A VERTICAL RESTRICTOR

(71) Applicant: GM GLOBAL TECHNOLOGY OPERATIONS LLC, Detroit, MI (US)

(72) Inventor: William J. Barnes, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 62 days.

(21) Appl. No.: 17/677,107

(22) Filed: Feb. 22, 2022

(65) Prior Publication Data

US 2023/0264646 A1 Aug. 24, 2023

(51) Int. Cl.
*B60R 21/2338* (2011.01)
*B60R 21/2342* (2011.01)
*B60R 21/205* (2011.01)

(52) U.S. Cl.
CPC ........ *B60R 21/2338* (2013.01); *B60R 21/205* (2013.01); *B60R 21/2342* (2013.01); *B60R 2021/23382* (2013.01)

(58) Field of Classification Search
CPC .............. B60R 21/2338; B60R 21/205; B60R 21/2342; B60R 2021/23382
See application file for complete search history.

(56) References Cited

U.S. PATENT DOCUMENTS

| | | | | |
|---|---|---|---|---|
| 5,350,188 A * | 9/1994 | Sato | ................... | B60R 21/2338 280/739 |
| 5,358,273 A * | 10/1994 | Onishi | ................ | B60R 21/2338 280/743.1 |
| 6,109,649 A * | 8/2000 | Adomeit | ................ | B60R 21/233 280/740 |
| 6,241,283 B1 * | 6/2001 | Zarazua | ................ | B60R 21/233 280/743.2 |
| 6,390,501 B1 * | 5/2002 | Greib | .................... | B60R 21/233 280/739 |
| 6,454,300 B1 * | 9/2002 | Dunkle | ............... | B60R 21/2338 280/743.2 |
| 6,929,285 B2 * | 8/2005 | Yamada | ................ | B60R 21/233 280/743.2 |
| 7,093,854 B2 * | 8/2006 | Fischer | ............... | B60R 21/2338 280/743.2 |
| 7,134,691 B2 * | 11/2006 | Dunkle | ............... | B60R 21/2338 280/743.2 |
| 7,398,992 B2 * | 7/2008 | Marriott | ................ | B60R 21/231 280/743.1 |
| 7,441,805 B2 * | 10/2008 | Jamison | ................ | B60R 21/233 280/743.2 |
| 7,770,925 B2 * | 8/2010 | Seymour | ............... | B60R 21/239 280/743.1 |
| 7,878,539 B2 * | 2/2011 | Maripudi | .............. | B60R 21/201 280/740 |

(Continued)

*Primary Examiner* — Jason D Shanske
*Assistant Examiner* — Joselynn Y Sliteris
(74) *Attorney, Agent, or Firm* — CANTOR COLBURN LLP (57) ABSTRACT

An airbag module having a retainer, an airbag cushion affixed to the retainer, an inflator, affixed to the retainer, to inflate the airbag cushion and a vertical restrictor disposed inside the airbag cushion. The vertical restrictor being affixed to the airbag, cushion and to the retainer and configured to limit a distance the airbag cushion travels in a vertical direction during inflation.

13 Claims, 8 Drawing Sheets

(56) References Cited

U.S. PATENT DOCUMENTS

| | | | | |
|---|---|---|---|---|
| 7,967,331 B2* | 6/2011 | Lim | ................... | B60R 21/2338 |
| | | | | 280/740 |
| 8,684,407 B2* | 4/2014 | Fischer | .............. | B60R 21/2338 |
| | | | | 280/739 |
| 9,278,660 B2* | 3/2016 | Yamada | ................ | B60R 21/231 |
| 9,290,149 B2* | 3/2016 | Yamada | .............. | B60R 21/2338 |
| 10,857,966 B2* | 12/2020 | Deng | ................... | B60R 21/205 |
| 11,186,249 B2* | 11/2021 | Kippschull | ........... | B60R 21/235 |
| 11,299,122 B2* | 4/2022 | Choi | ................... | B60R 21/2338 |

* cited by examiner

AIRBAG MODULE HAVING A VERTICAL RESTRICTOR

INTRODUCTION

The disclosure relates to vehicle airbags. More specifically, the disclosure relates to an airbag module having a vertical restrictor disposed within an airbag cushion.

In general, vehicle airbags are used to protect vehicle occupants from injury in the event of a vehicle crash. Current airbag designs incorporate a variety of components that enhance the performance of the airbag. Often at least one of the airbags in a vehicle is disposed under a dashboard of the vehicle in front of a passenger seat. In general, the airbag is located under the dashboard in a position to allow for a suitable expansion zone between the airbag and the windshield of the vehicle to ensure sufficient room for deployment of the airbag. Accordingly, the slope of the windshield and the size of the expansion zone often restrict the positioning of the airbag.

SUMMARY

In one exemplary embodiment an airbag module is provided. The airbag module includes a retainer, an airbag cushion affixed to the retainer, and an inflator, affixed to the retainer, to inflate the airbag cushion. The airbag module also includes a vertical restrictor disposed inside the airbag cushion, the vertical restrictor being affixed to the airbag cushion and to the retainer. The vertical restrictor is configured to limit a distance the airbag cushion travels in a vertical direction during inflation.

In addition to the one or more features described herein the vertical restrictor includes a folded portion secured by one or more stitches configured to separate during inflation of the airbag cushion.

In addition to the one or more features described herein a length of the vertical restrictor is determined based on the distance between a point at which the vertical restrictor affixes to the retainer and a windshield of a vehicle containing the airbag module.

In addition to the one or more features described herein the length of the vertical restrictor is further determined based on an elasticity of the vertical restrictor.

In addition to the one or more features described herein the vertical restrictor includes an aperture configured to receive a portion of the inflator.

In addition to the one or more features described herein the airbag module further includes a low-risk deployment flap configured to control a trajectory of the airbag cushion during inflation, the low-risk deployment flap includes a first end fixed to the retainer and a second end placed a top of the airbag cushion.

In addition to the one or more features described herein the airbag module further includes a horizontal restrictor disposed inside the airbag cushion, the horizontal restrictor being affixed to the airbag cushion, wherein the horizontal restrictor is configured to limit a distance the airbag cushion travels towards a seat during inflation.

In addition to the one or more features described herein the vertical direction is a direction perpendicular to a top surface of the inflator.

In another exemplary embodiment a vehicle having a windshield, a passenger seat, a dashboard located in front of the passenger seat; and an airbag module disposed beneath the dashboard is provided. The airbag module includes a retainer, an airbag cushion affixed to the retainer, an inflator, affixed to the retainer, to inflate the airbag cushion, and a vertical restrictor disposed inside the airbag cushion. The vertical restrictor is affixed to the airbag cushion and to the retainer and is configured to ensure the airbag cushion does not break the windshield during inflation.

In addition to the one or more features described herein the vertical restrictor includes a folded portion secured by one or more stitches configured to separate in a controlled staged manner during inflation of the airbag cushion.

In addition to the one or more features described herein a length of the vertical restrictor is determined based on the distance between a point at which the vertical restrictor affixes to the retainer and the windshield.

In addition to the one or more features described herein the length of the vertical restrictor is further determined based on an elasticity and unfolding of the vertical restrictor.

In addition to the one or more features described herein the vertical restrictor includes an aperture configured to receive a portion of the inflator.

In addition to the one or more features described herein the airbag module further includes a low-risk deployment flap configured to control a trajectory of the airbag cushion during inflation when contacting an out of position occupant, the low-risk deployment control flap including a first end fixed to the retainer and a second end second end placed a top of the airbag cushion.

In addition to the one or more features described herein the airbag module further includes a horizontal restrictor disposed inside the airbag cushion, the horizontal restrictor being affixed to the airbag cushion and to the vertical restrictor, wherein the horizontal restrictor is configured to limit a distance the airbag cushion travels towards a seat during inflation.

In addition to the one or more features described herein the vertical direction is a direction perpendicular to a top surface of the inflator.

In addition to the one or more features described herein the vertical restrictor includes two or more straps.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. It should be understood that throughout the drawings, corresponding reference numerals indicate like or corresponding parts and features.

Turning now to an overview of the aspects of the disclosure, embodiments of the disclosure include an airbag module having a vertical restrictor disposed within the airbag cushion. In exemplary embodiments, the vertical restrictor includes one or more straps that are configured to limit the distance that the airbag cushion travels in a vertical direction during inflation. As used herein, the vertical direction is a direction approximately perpendicular to the top surface of the airbag module. By limiting the distance the airbag cushion travels in the vertical direction during inflation, the vertical restrictor prevents the airbag cushion from shattering the windshield.

Figure 1A:
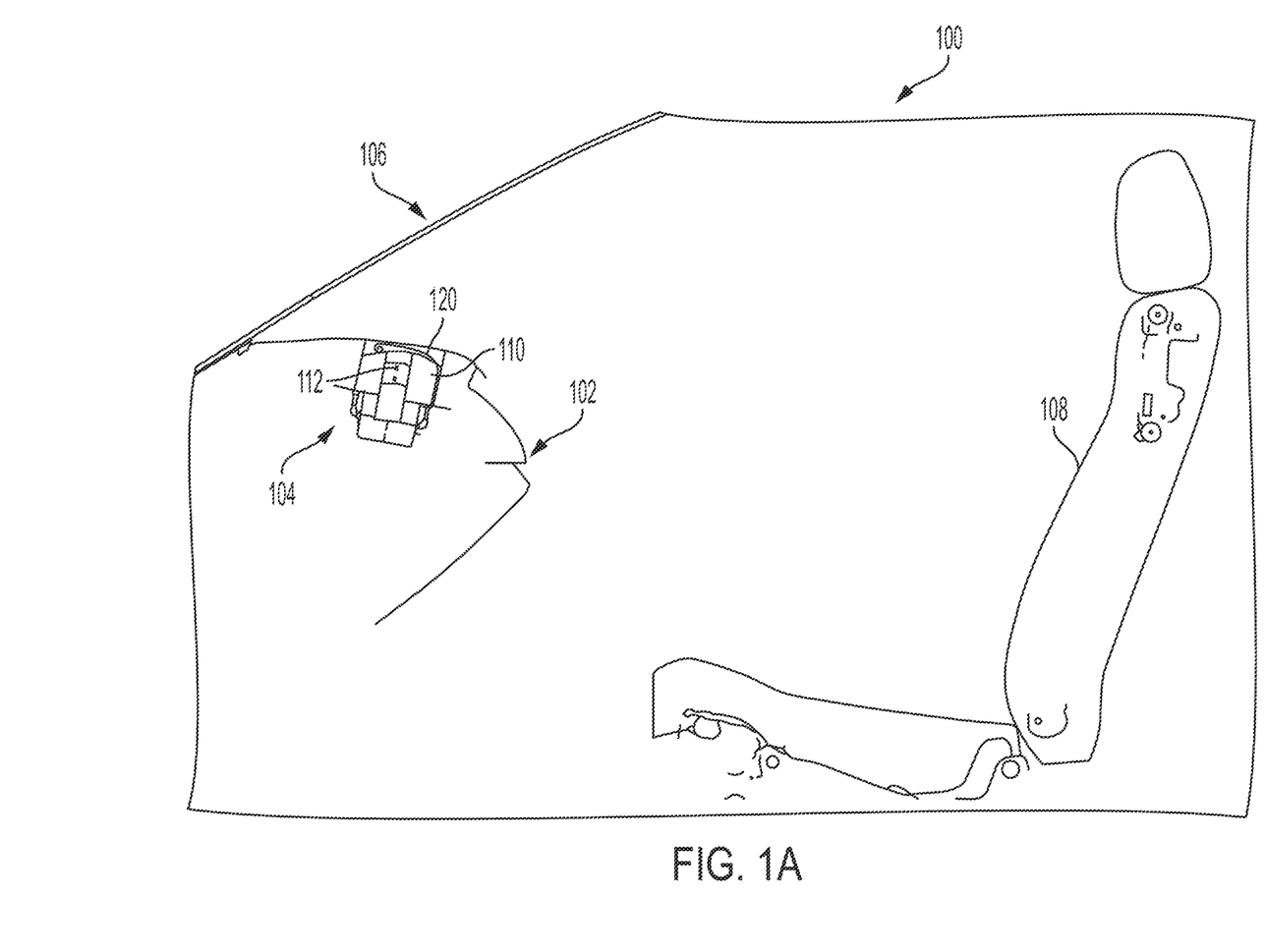
FIG. 1A is a schematic diagram illustrating a portion of an interior of a vehicle having an airbag module with a vertical restrictor prior to airbag deployment, in accordance with an exemplary embodiment.
Figure 1B:
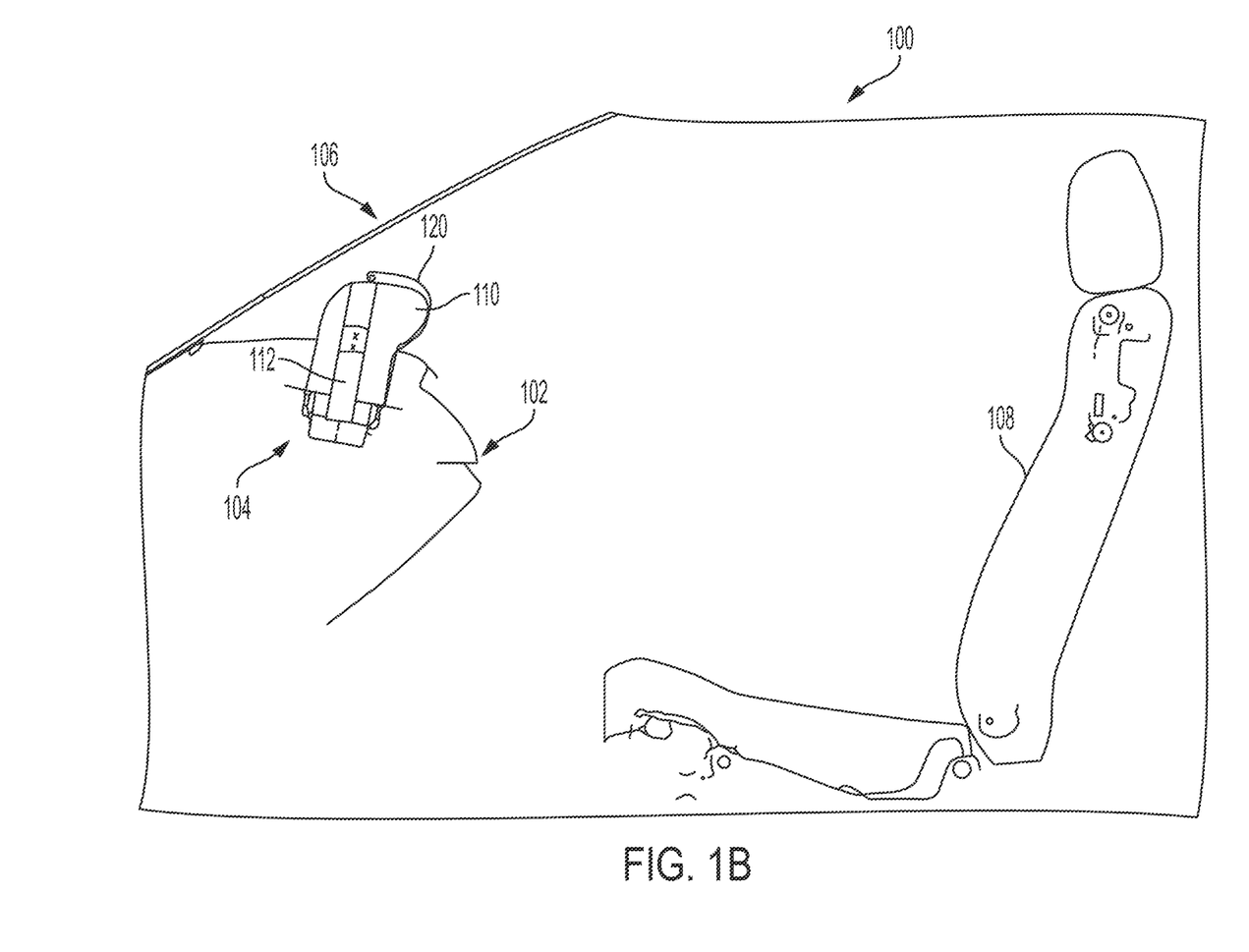
FIGS. 1B and 1C are schematic diagrams illustrating a portion of an interior of a vehicle having an airbag module with a vertical restrictor during airbag deployment, in accordance with an exemplary embodiment.
Figure 1C:
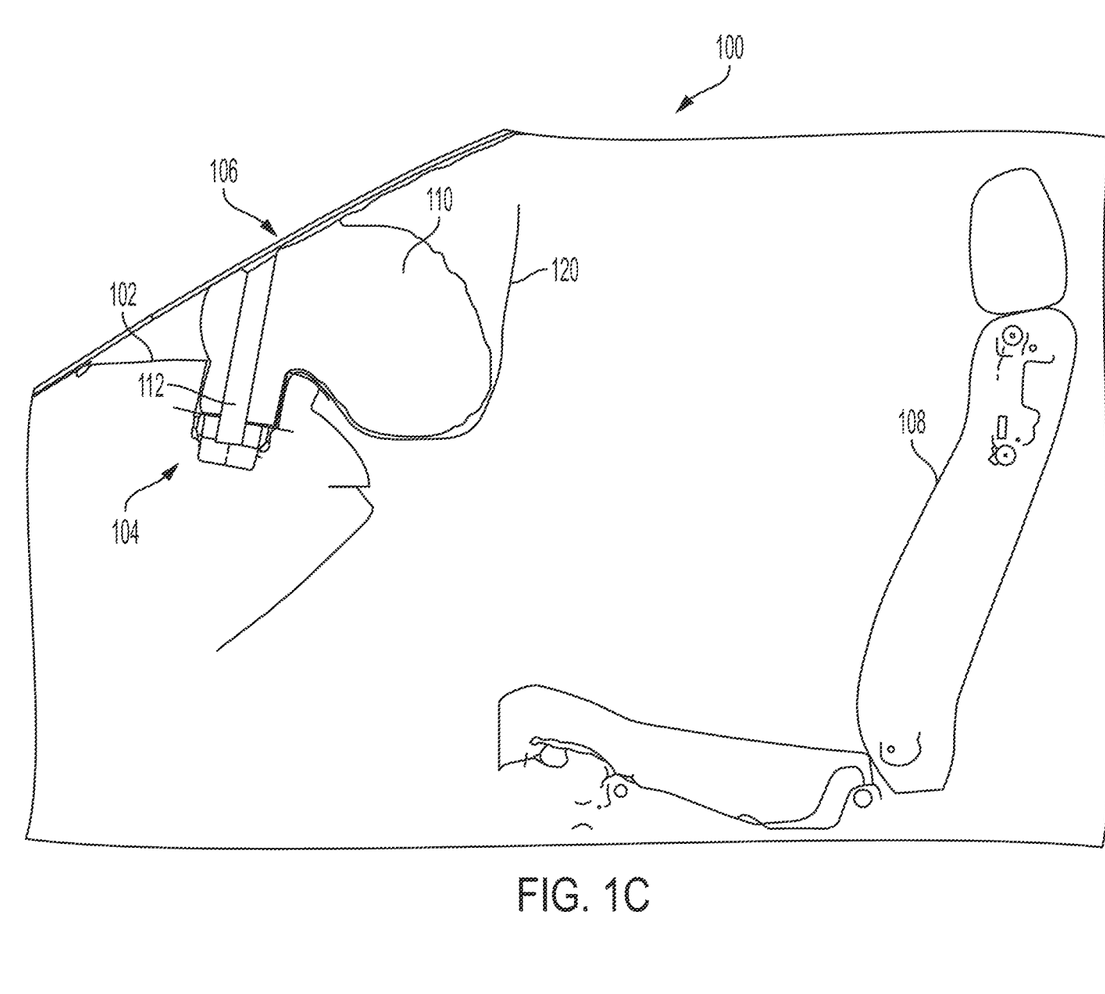
Figure 1D:
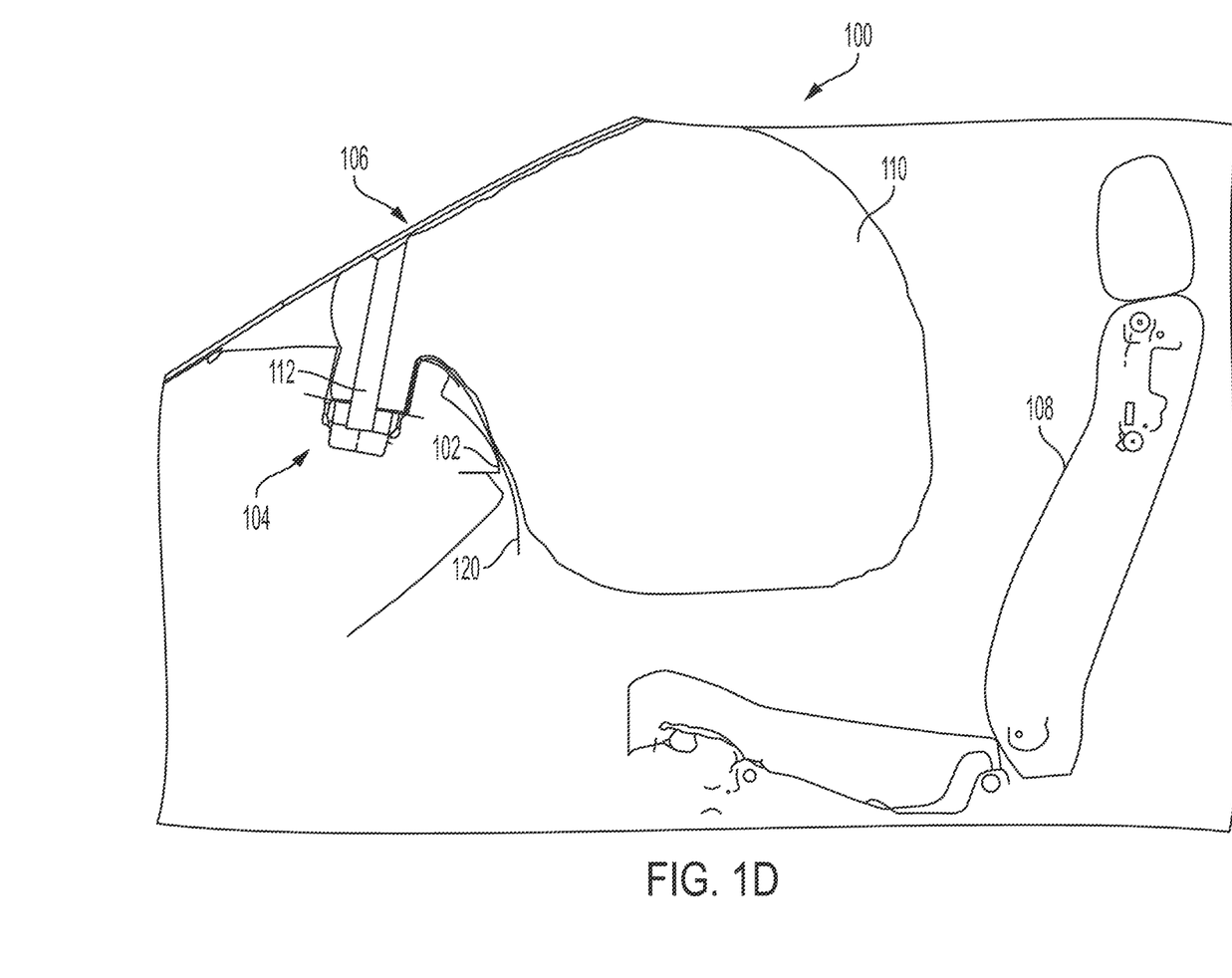
FIG. 1D is a schematic diagram illustrating an interior of a vehicle having an airbag module with a vertical restrictor after airbag deployment, in accordance with an exemplary embodiment.

Referring now to FIGS. 1A, 1B, 1C and 1D, a portion of an interior 100 of a vehicle having an airbag module 104 with a vertical restrictor 112 are shown during various stages of deployment of the airbag cushion 110. FIG. 1A shows the airbag module 104 prior to deployment of the airbag cushion 110, FIGS. 1B and 1C show the airbag module 104 during deployment of the airbag cushion 110, and FIG. 1D shows the airbag module 104 after deployment of the airbag cushion 110. As illustrated, the airbag module 104 is located below a dashboard 102 and in front of a passenger seat 108. The airbag module 104 includes an airbag cushion 110 and a vertical restrictor 112 disposed within the airbag cushion 110.

During deployment of the airbag cushion 110, the vertical restrictor 112 is configured to ensure that the airbag cushion 110 does not break or shatter the windshield 106. In one embodiment, the vertical restrictor prevents the airbag cushion from impacting the windshield 106. In another embodiment, the vertical restrictor 112 is configured to limit the force with which the airbag cushion 110 impacts the windshield 106 to ensure that the windshield 106 is not broken or shattered.

In exemplary embodiments, the vertical restrictor 112 includes one or more straps that are affixed at one end to the airbag cushion 110 and at the other end to a housing or retainer of the airbag module 104. The lengths of the one or more straps are determined based at least in part upon a distance between the airbag module and the windshield 106. In exemplary embodiments, the lengths of the one or more straps are further determined based upon the elasticity of a material that the one or more straps are made from.

In exemplary embodiments, the use of the vertical restrictor 112 disposed within the airbag cushion 110 permits greater control of a vertical distance that the airbag cushion 110 will travel during deployment and therefore allows for greater freedom in the placement of the airbag module 104. In one embodiment, the airbag module 104 can be placed substantially closer to a front of a vehicle than a traditional airbag module without increasing the risk of shattering the windshield 106 during deployment of the airbag cushion.

In exemplary embodiments, the airbag module 104 also includes a low-risk deployment (LRD) flap 120 that is disposed on the outside of the airbag cushion 110. The LRD flap 120 is affixed at one end to the airbag module 104 and has an opposing end that is placed atop of the airbag cushion 110. During inflation of the airbag cushion 110, the LRD flap 120 is configured to control a trajectory of the airbag cushion during inflation when contacting an out of position occupant. In exemplary embodiments, the placement of the vertical restrictor 112 within the airbag cushion 110 prevents interactions between the vertical restrictor 112 and the LRD flap 120 during inflation of the airbag cushion.

Figure 2A:
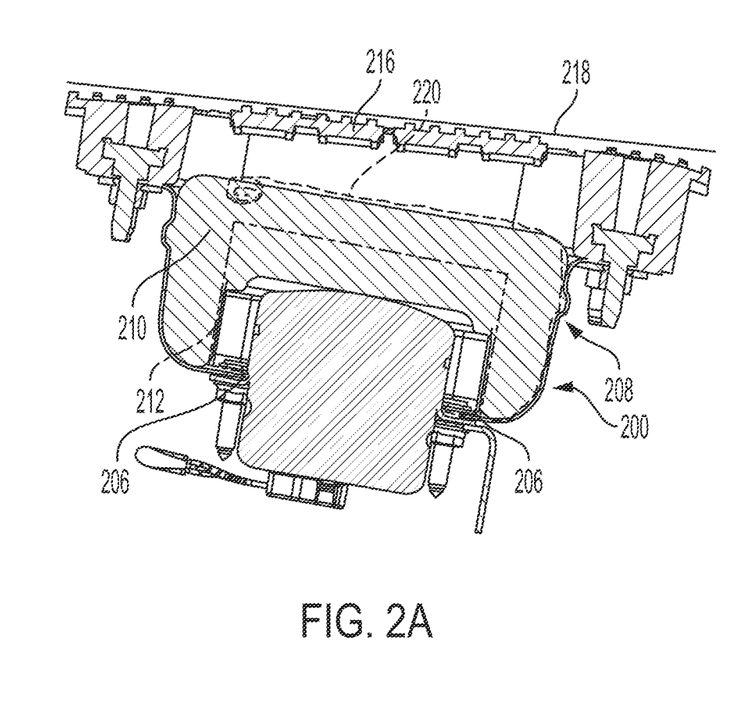
FIG. 2A is a cross-sectional view of an airbag module in accordance with an exemplary embodiment.
Figure 2B:
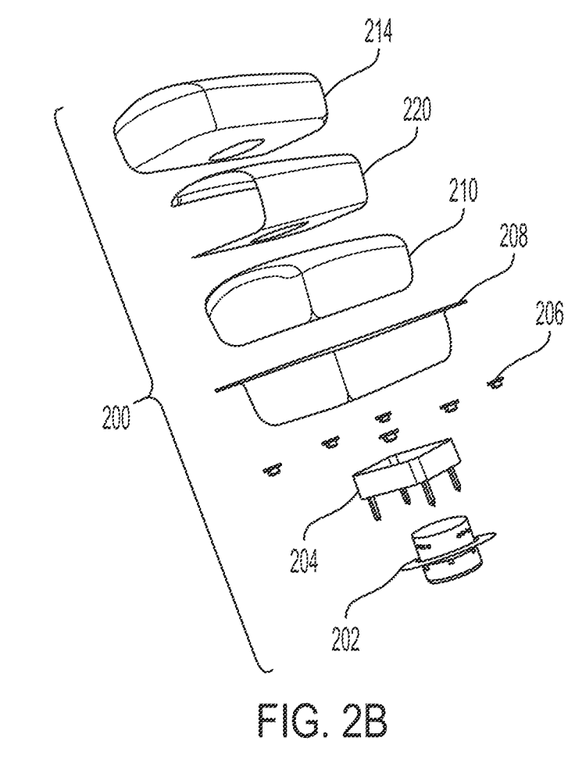
FIG. 2B is a disassembled view of an airbag module in accordance with an exemplary embodiment.

Referring now to FIGS. 2A and 2B cross-sectional and disassembled views of an airbag module 200 in accordance with exemplary embodiments are respectively shown. As best shown in FIG. 2B, the airbag module 200 includes an inflator 202, a retainer 204, a housing 208 that is affixed to the retainer 204 by one or attachment devices 206, an airbag cushion 210, a low-risk deployment (LRD) flap 220, and a wrap 214. The airbag cushion 210 includes a vertical restrictor 212 that is disposed inside the airbag cushion 210. In one embodiment, the vertical restrictor 212 is affixed to the retainer 204 by one or more attachment devices 206 and to the airbag cushion 210 using a plurality of stitches. The airbag module 200 is disposed below a dashboard 218 and a deployment door 216.

The LRD flap 220 includes a first end fixed to the retainer 204 and a second end placed atop of the folded cushion. In one embodiment, the low-risk deployment (LRD) flap 220 is configured to protect the head of an out of position occupant as the airbag cushion 210 is deployed and the head comes in contact with the airbag cushion 210. In another embodiment, the LRD flap 220 is configured to control the trajectory of the airbag cushion 210 during inflation. In exemplary embodiments, the placement of the vertical restrictor 212 inside of the airbag cushion 210, as opposed to outside of the airbag cushion 210, prevents interaction between the vertical restrictor 212 and the LRD flap 220.

Figure 3:
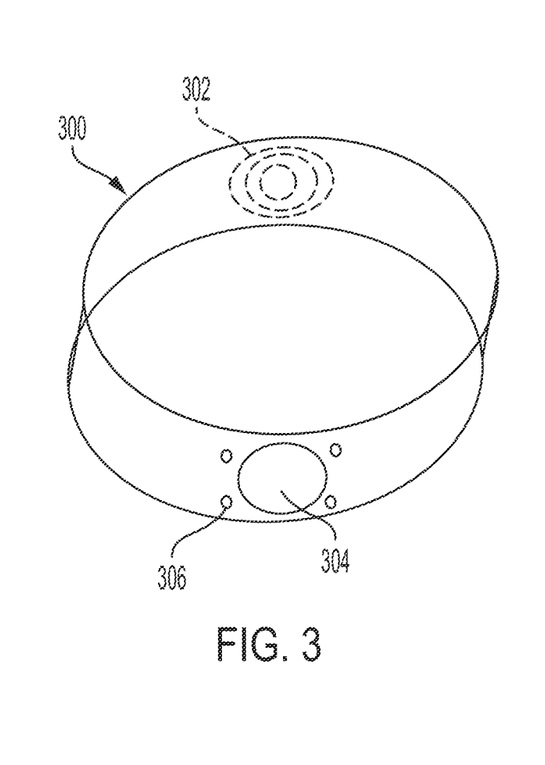
FIG. 3 shows a vertical restrictor in accordance with an exemplary embodiment.

Referring now to FIG. 3 a vertical restrictor 300 in accordance an embodiment is shown. As illustrated, the vertical restrictor 300 is a circular strap that includes an aperture 304 configured to receive a portion of the inflator and a plurality of apertures 306 that are configured to secure the strap to the retainer. In one embodiment, the vertical restrictor 300 also includes one or more indicators 302 that are used to indicate locations for stitching the vertical restrictor 300 to an airbag cushion. In exemplary embodiments, the length of vertical restrictor 300 is determined based, at least in part, on the available space between an airbag, module and a windshield. In addition, the length of the vertical restrictor 300 can be further based on the elasticity of the vertical restrictor 300.

Figure 4A:
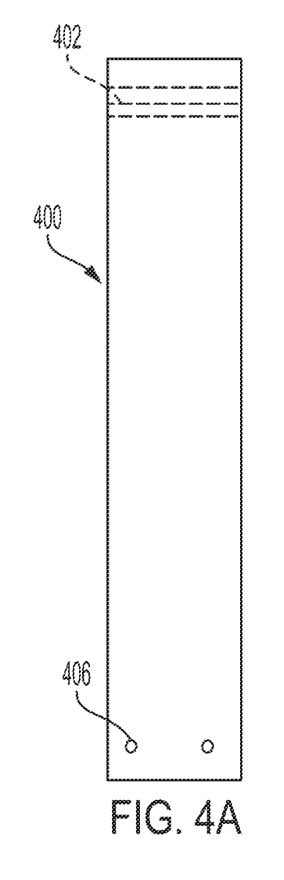
FIGS. 4A and 4B respectively show a frontal view and a side view of a vertical restrictor in accordance with an exemplary embodiment.
Figure 4B:
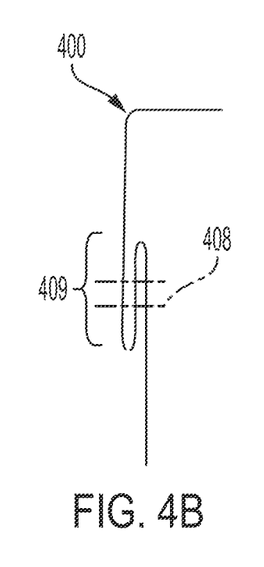

FIGS. 4A and 4B respectively show a frontal and side view of a vertical restrictor in accordance with an exemplary embodiment. As illustrated, the vertical restrictor 400 is a strap that includes a plurality of apertures 406 that are configured to secure the vertical restrictor 400 to the retainer at a first end of the vertical restrictor. The vertical restrictor also includes one or more indicators 402 that are used to indicate locations for stitching the vertical restrictor 400 to an airbag cushion. In exemplary embodiments, the vertical restrictor 400 includes a folded portion 409 that includes one or more stitches 408, such as tack or basting stitches. The one or more stitches 408 are configured to secure the folded portions 409 of the vertical restrictor 400 to one another and to separate from one another during inflation of the airbag cushion. In one embodiment, the one or more stitches 408 are configured to incrementally separate in a controlled manner. For example, different stitches 408 are configured to fail in response to different amounts of force. The length of the vertical restrictor 400, the number and location of the folds and stitches 408 that are used to secure the folds are determined based on the desired kinematics of the inflation of the airbag cushion and the available space between an airbag module and a windshield. In addition, the length of the vertical restrictor 400 can be further based on the elasticity of the vertical restrictor 400.

Figure 5A:
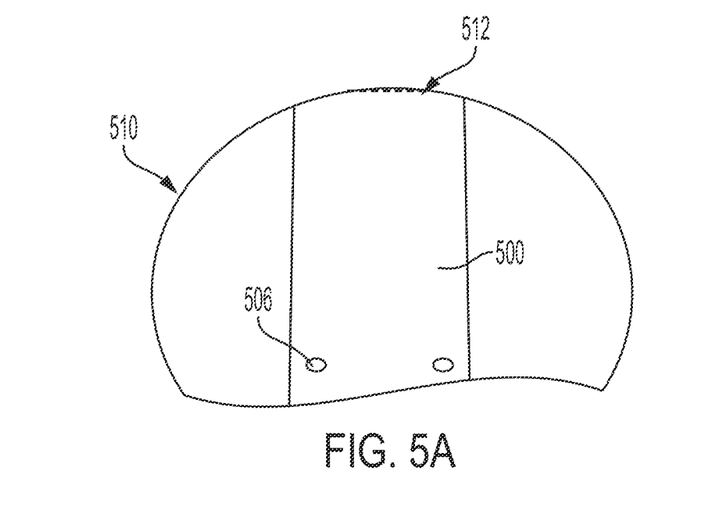
FIGS. 5A and 5B show cross-sectional views of a vertical restrictor disposed within an airbag cushion in accordance with an exemplary embodiment.
Figure 5B:
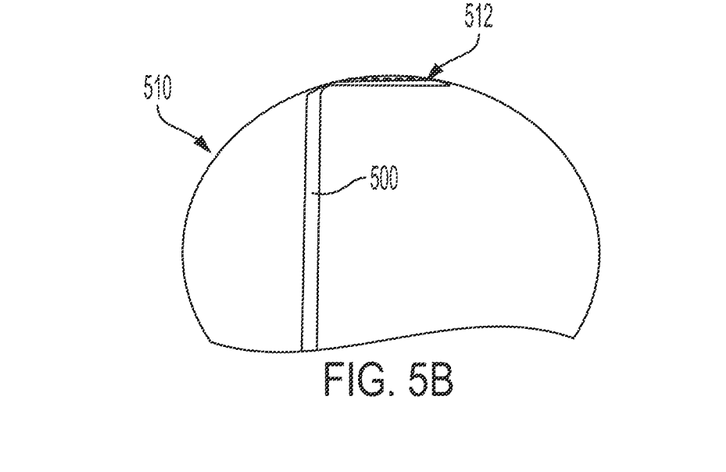
Figure 5C:
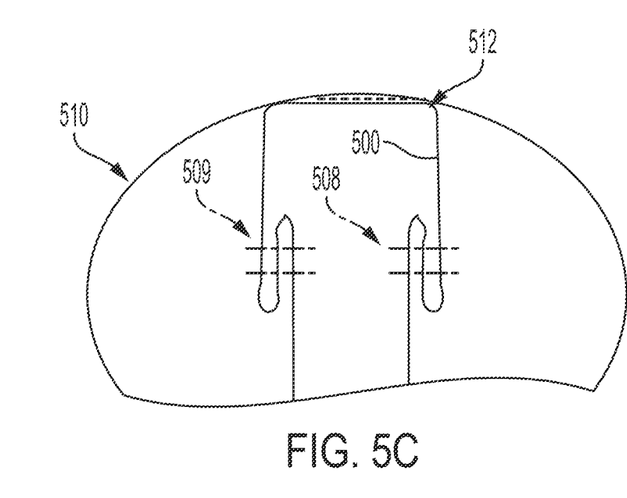
FIGS. 5C and 5D show cross-sectional views of vertical restrictors disposed within an airbag cushion in accordance with exemplary embodiments.
Figure 5D:
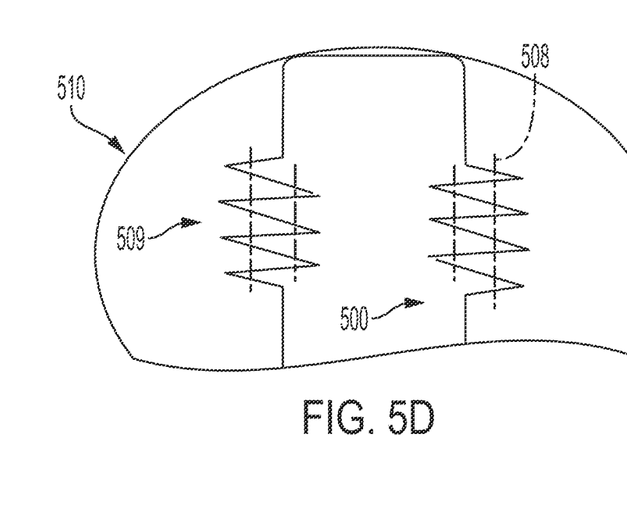

Referring now to FIGS. 5A and 5B cross-sectional views of a vertical restrictor 500 disposed within an airbag cushion 510 in accordance with an exemplary embodiment are shown. The vertical restrictor 500 includes a first end having a plurality of apertures 506 that are configured to secure the vertical restrictor 500 to a retainer at a first end of the vertical restrictor. The opposing end of the vertical restrictor 500 is secured to the airbag cushion 510 via one or more stitches 512. FIGS. 5C and 5D show cross-sectional views of vertical restrictors 500 disposed within an airbag cushion 510 in accordance with additional exemplary embodiments. The vertical restrictors 500 shown in FIGS. 5C and 5D include folded portions 509 that have folds that are secured to one another by one or more stitches 508. Stitches 508 are configured to secure the folded portions 509 of the vertical restrictor 500 to one another and to allow the folds to separate from one another during inflation of the airbag cushion 510. In exemplary embodiments, the number and location of the folds and stitches 508 that are used to secure the folds are determined based on the desired kinematics of the inflation of the airbag cushion 510.

In exemplary embodiments, the vertical restrictor is made of a material suitable to withstand the stress of the deployment of the airbag cushion without ripping or tearing. In addition, the material may be selected for the vertical restrictor based at least in part on the elasticity of the material. In one embodiment, the vertical restrictor is made of nylon, which may be coated or uncoated. In other embodiments, the vertical restrictor is made of a polyester material or a rubberized urethane. In exemplary embodiments, the durability and elasticity of the material across a wide range of environmental conditions (i.e., different operating temperatures) are considered in selecting the material for the vertical restrictor Various configurations of vertical restrictors have been shown and described herein, however, it will be appreciated by those of skill in the art that numerous other configurations of vertical restrictors may be used and that the embodiments shown and described herein are intended to be exemplary in nature and are not exhaustive.

Figure 6:
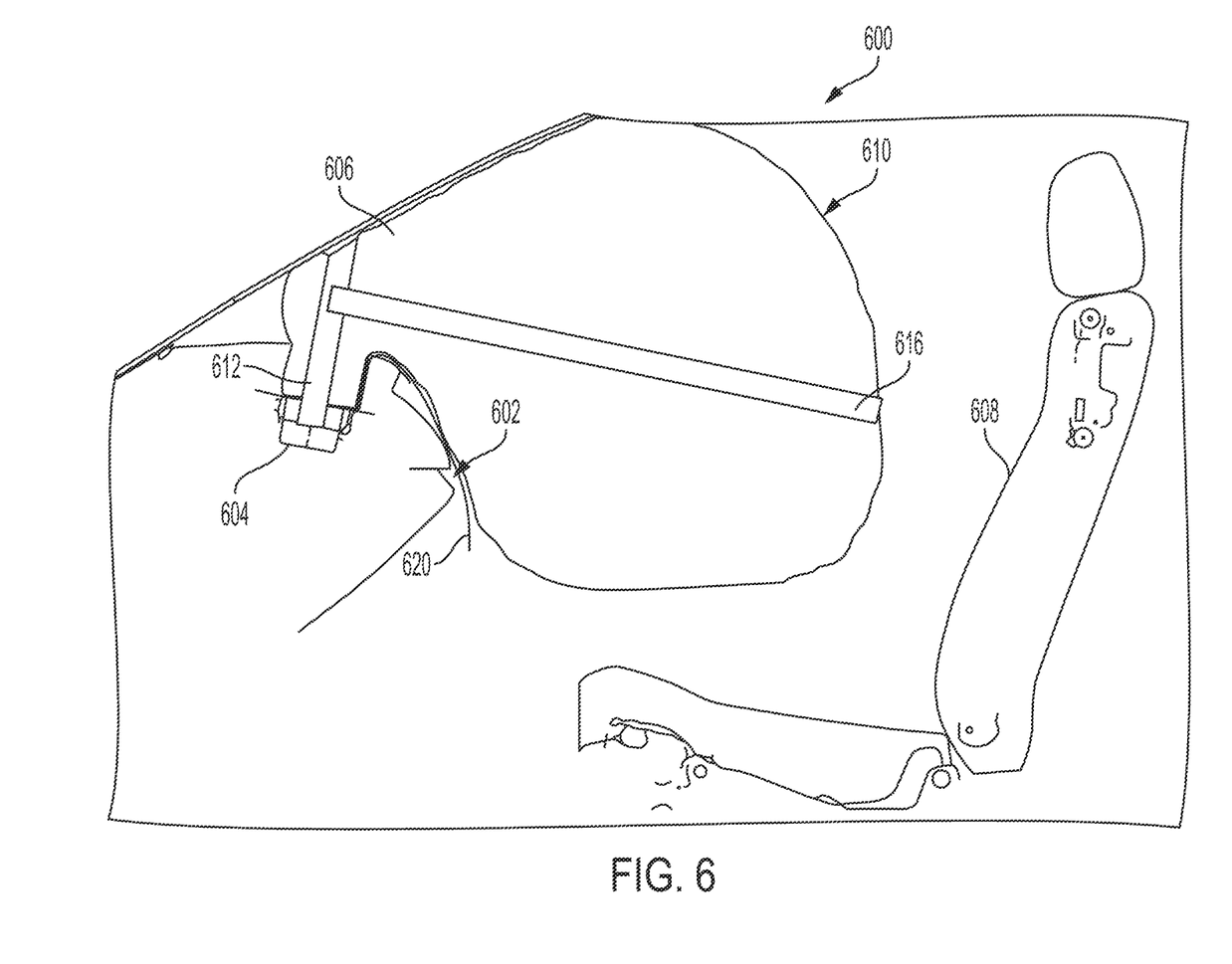
FIG. 6 is a schematic diagram illustrating an interior of a vehicle having an airbag module with a vertical restrictor and a horizontal restrictor after airbag deployment, in accordance with an exemplary embodiment.

FIG. 6 shows a portion of an interior 600 of a vehicle having an airbag module 604 with a vertical restrictor 612 and horizontal restrictor 616 after airbag deployment in accordance with an exemplary embodiment. As illustrated, the airbag module 604 is located below a dashboard 602 and in front of a seat 608. The airbag module 604 includes an airbag cushion 610, a vertical restrictor 612 disposed within the airbag cushion 610, and a horizontal restrictor 616 disposed within the airbag cushion 610. The vertical restrictor 612 includes a first portion that is affixed to the airbag cushion 610 and a second portion that is affixed to a housing of the airbag module 604. In exemplary embodiments, the airbag module 604 also includes a low-risk deployment (LRD) flap 620 that is disposed on the outside of the airbag cushion 610.

During deployment of the airbag cushion 610, the vertical restrictor 612 is configured to ensure that the airbag cushion 610 does not break or shatter the windshield 606. In one embodiment, the vertical restrictor prevents the airbag cushion 610 from impacting the windshield 606. In another embodiment, the vertical restrictor 612 is configured to limit the force with which the airbag cushion 610 impacts the windshield 606 to ensure that the windshield 606 is not broken or shattered.

During deployment of the airbag cushion 610, the horizontal restrictor 616 is configured to limit the distance that the airbag cushion 610 travels towards the seat 608. In one embodiment, the horizontal restrictor 616 includes a first portion that is affixed to the airbag cushion 610 and a second portion that is affixed to vertical restrictor 612. In another embodiment (not shown), the horizontal restrictor 616 includes a first portion that is affixed to the airbag cushion 610 and a second portion that is affixed to a housing or retainer of the airbag module 604. In one embodiment, the airbag cushion 610 may include a plurality of horizontal restrictors. In exemplary embodiments, the horizontal restrictor 616 includes a folded portion with tack stitches similar to the vertical restrictor shown in FIG. 4B.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, (i.e., one, two, three, four, etc.). The terms "a plurality" may be understood to include any integer number greater than or equal to two, (i.e., two, three, four, five, etc.). The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An airbag module comprising:
a retainer;
an airbag cushion affixed to the retainer;
an inflator, affixed to the retainer, to inflate the airbag cushion;
a vertical restrictor disposed inside the airbag cushion, the vertical restrictor being affixed to the airbag cushion and to the retainer; and
a horizontal restrictor disposed inside the airbag cushion, the horizontal restrictor being affixed to the airbag cushion at a first end and to the vertical restrictor at a second end,
wherein the horizontal restrictor is configured to limit a distance the airbag cushion travels towards a seat during inflation, and
wherein the vertical restrictor is configured to limit a distance the airbag cushion travels in a vertical direction during inflation.

2. The airbag module of claim 1, wherein the vertical restrictor includes a folded portion secured by one or more stitches configured to separate during inflation of the airbag cushion.

3. The airbag module of claim 1, wherein a length of the vertical restrictor is determined based on a distance between a point at which the vertical restrictor affixes to the retainer and a windshield of a vehicle containing the airbag module.

4. The airbag module of claim 3, wherein the length of the vertical restrictor is further determined based on an elasticity of the vertical restrictor.

5. The airbag module of claim 1, wherein the vertical restrictor includes an aperture configured to receive a portion of the inflator.

6. The airbag module of claim 1, further comprising a low-risk deployment flap configured to control a trajectory of the airbag cushion during inflation, the low-risk deployment flap includes a first end fixed to the retainer and a second end placed atop of the airbag cushion.

7. The airbag module of claim 1, wherein the vertical direction is a direction perpendicular to a top surface of the inflator.

8. A vehicle comprising:
a windshield;
a passenger seat;
a dashboard located in front of the passenger seat; and
an airbag module disposed beneath the dashboard, the airbag module comprising:
a retainer;
an airbag cushion affixed to the retainer;
an inflator, affixed to the retainer, to inflate the airbag cushion; and
a vertical restrictor disposed inside the airbag cushion, the vertical restrictor being affixed to the airbag cushion and to the retainer; and
a horizontal restrictor disposed inside the airbag cushion, the horizontal restrictor being affixed to the airbag cushion at a first end and to the vertical restrictor at a second end,
wherein the horizontal restrictor is configured to limit a distance the airbag cushion travels towards the passenger seat during inflation,
wherein the vertical restrictor is configured to ensure the airbag cushion does not break the windshield during inflation.

9. The vehicle of claim 8, wherein the vertical restrictor includes a folded portion secured by one or more stitches configured to separate during inflation of the airbag cushion.

10. The vehicle of claim 8, wherein a length of the vertical restrictor is determined based on a distance between a point at which the vertical restrictor affixes to the retainer and the windshield.

11. The vehicle of claim 10, wherein the length of the vertical restrictor is further determined based on an elasticity of the vertical restrictor.

12. The vehicle of claim 8, wherein the vertical restrictor includes an aperture configured to receive a portion of the inflator.

13. The vehicle of claim 8, wherein the airbag module further comprises a low-risk deployment flap configured to control a trajectory of the airbag cushion during inflation, the low-risk deployment control flap including a first end fixed to the retainer and a second end placed atop of the airbag cushion.

* * * * *